Dec. 17, 1940.   P. B. TAYLOR ET AL   2,225,136
JOURNAL BEARING
Filed Feb. 14, 1939

INVENTORS
PHILIP B. TAYLOR
AND WILTON G. LUNDQUIST
BY
ATTORNEY

Patented Dec. 17, 1940

2,225,136

UNITED STATES PATENT OFFICE 2,225,136

JOURNAL BEARING

Philip B. Taylor, Upper Montclair, and Wilton G. Lundquist, Glen Rock, N. J., assignors to Wright Aeronautical Corporation, a corporation of New York Application February 14, 1939, Serial No. 256,280

14 Claims. (Cl. 184—6)

This invention concerns the cooling of bearings, relating particularly to the crankpin bearings of crankshafts used in radial cylinder internal combustion engines.

It so happens that in radial cylinder engines the predominant loading on the crankpin journal under all normal operating conditions is on the inside of the journal—that is, that sector or segment of the journal closest to the crankshaft center line. This is due to the fact that the center of gravity of the connecting rod system including the pistons is approximately coincidental with the crankpin center and accordingly, the centrifugal force of the system acts radially outward upon the crankpin despite the explosion loads imposed thereon by any engine cylinder which may be in its power cycle. The centrifugal force of the system is greater than any of the individual piston and rod power impulses or inertia effects. Thus, the maximum bearing pressure occurs upon the inside of the crankpin and the greatest amount of frictional heat is concentrated in this inner zone. The conventional lubricating system for this type of engine utilizes a hollow crankshaft for conducting lubricating oil to the various bearings including the crankpin bearing and this oil serves the added function of removing heat from the crankpin journal, this being virtually the only means of cooling the journal since little or no heat radiating surface is provided therefor. On the other hand, bearing friction heat developed in the connecting rod itself is dissipated with comparatively little difficulty since this member normally has a considerable surface area and is moving at high speed within the engine crankcase.

It is an object of this invention to provide improvements in cooling of crankpin journals, a further object being to provide means by which the bearing coolant is so directed as to impinge first upon the hottest parts of the journal whereby the temperature of the whole journal is maintained at a substantially uniform level. A further object is to provide means for cooling hollow shafting, an associated object to so organize the cooling system that the hottest parts of the shaft receive the cooling medium first as it enters the journal zone, whereby the temperature of the system is maintained substantially uniform and whereby the heat is removed from the hottest shaft portions as it is generated therein.

Figure 1:
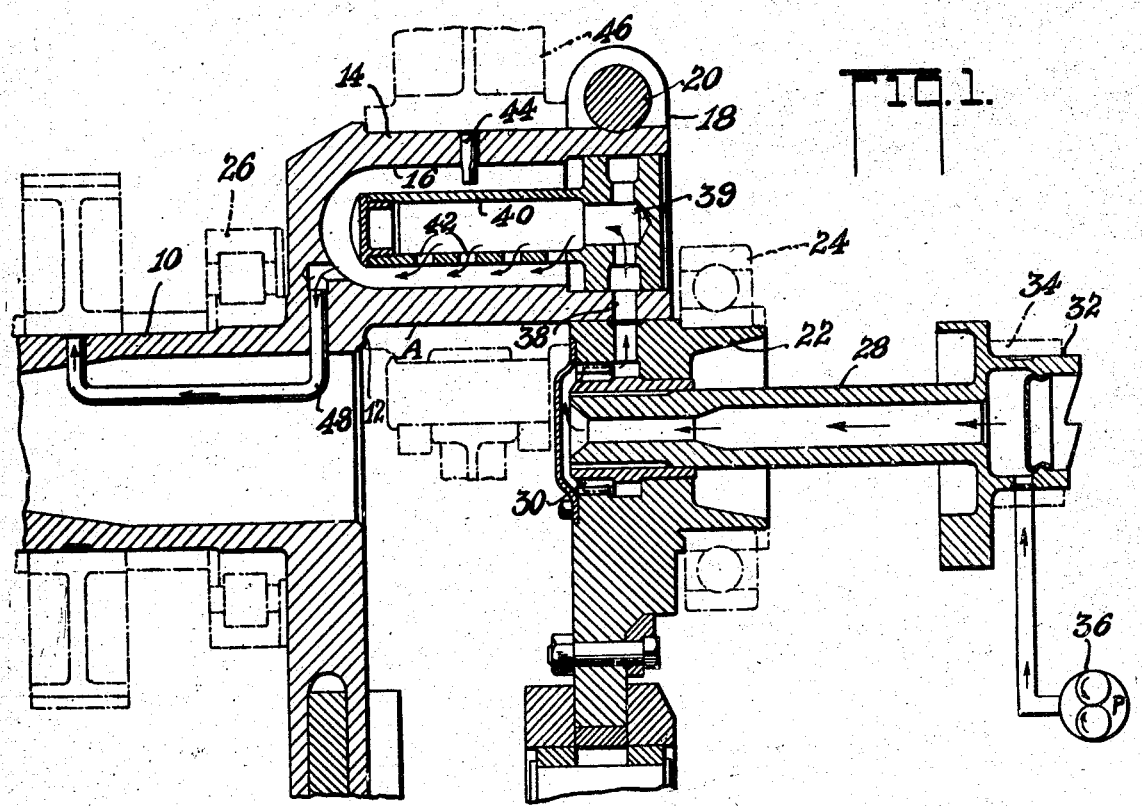
Figure 2:
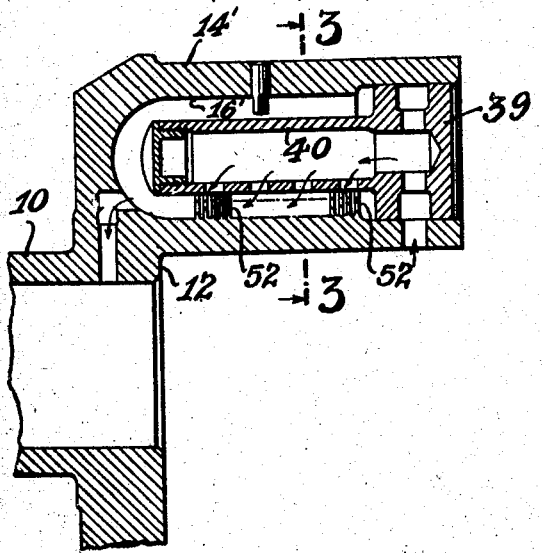
Figure 3:
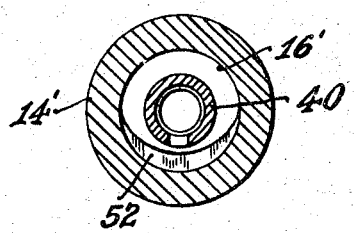

Further objects will become apparent in reading the annexed detailed description in connection with the drawing, in which, Fig. 1 is a longitudinal section through a radial engine crankshaft incorporating the cooling provisions of the invention;

Fig. 2 is a longitudinal section of the crankpin portion of a shaft showing an alternative arrangement, and Fig. 3 is a section on the line 3—3 of Fig. 2.

In Fig. 1, we illustrate a more or less conventional radial engine crankshaft comprising a forward shaft element 10, a crankcheek 12 and a crankpin 14 integral therewith, the crankpin being bored out as at 16 to lighten the assembly and also to provide an oil containing cavity. The shaft member 10 is also hollow for lightness. To the rear end of the crankpin 14 a rear cheek 18 is clamped by a bolt 20, the cheek having an integral shaft journal 22 embraced by a bearing 24 carried in the conventional manner in the supporting crankcase structure. The shaft 10 likewise is carried in a bearing 26 supported in the crankcase, not shown.

In the rear cheek 18 an extension shaft 28 is splined as at 30, this extension shaft having a journal 32 engaging an oil transfer bearing 34 fed from an oil pump 36. The extension shaft is hollow as indicated and conducts oil from the transfer bearing to a conduit 38 comprised by radial drillings in the crankcheek 18 in the rear end of the crankpin 14 and in a plug 39 forming a closure for the crankpin bore 16. Said plug carries an integral cylindrical extension 40 closed at its forward end, projecting into the bore 16 in spaced relation to the walls thereof, said extension 40 having holes 42 on that wall thereof which faces the axis of the shaft assembly. Oil may pass into the hollow of the extension 40, through the holes 42 to impinge upon that wall of the bore 16 which is closest to the crankshaft axis. Thence, the oil fills the bore 16 and from the bore oil is led through a tube 44 to the connecting rod bearing, the connecting rod being indicated at 46. Oil also passes through a conduit 48 in the crankcheek 12 and in the shaft portion 10 for lubricating other parts of the engine.

As pointed out toward the beginning of the specification, the innermost part of the crankpin 14, indicated at A, is virtually continuously loaded under a high unit bearing pressure, from which local frictional heat is developed, other parts of the pin sustaining little or no bearing load. Since the lubricating oil is directed against that part of the crankpin bore wall closest to the loaded portion A, heat is properly removed therefrom by the impingement of cooling oil thereon, resulting in a more uniform temperature throughout the periphery of the crankpin.

In Fig. 2, we show the crankpin 14' integral with the shaft 10 and the cheek 12, said pin 14' being bored as above described and having formed integrally with the pin, and within the bore 16', a plurality of cooling fins 52 which are segmental in form, the segments occupying only a zone in the bore 16' which is closest to the crankpin axis. The crankpin plug 39 with its extension 40 is similar to that first described. The finned crankpin interior permits of the dissipation of a greater amount of heat to the cooling oil directed thereagainst. This finned crankpin arrangement may be used in crankshaft systems where the inner side of the crankpin journal shows evidence of excessive temperatures.

Although the provisions of this invention are particularly shown in connection with crankshafts for radial cylinder engines, use may be made of the principles of the invention in any kind of shaft system wherein cooling of journals is required or wherein certain portions of the journals run hotter than others. For instance, any journal having a bearing load applied predominantly to one side thereof is a suitable subject for the application for the principles of the invention.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an engine crankshaft having a hollow crankpin, means borne by the pin tending to load the pin predominantly and continuously on one side thereof, whereby said loaded side tends to become hotter than other parts of the pin, means for introducing cooling lubricant within the pin hollow, and means directing the introduced lubricant first against that part of the interior wall of the pin closest to said loaded side and thence through the crankpin to the crankpin bearing for lubrication thereof.

2. In an engine crankshaft having a hollow crankpin, means borne by the pin tending to load the pin predominantly and continuously on one side thereof, whereby said loaded side tends to become hotter than other parts of the pin, means for introducing cooling lubricant within the pin hollow, and means directing the introduced lubricant first against that part of the interior wall of the pin closest to said loaded side, said interior wall part having heat radiating fins formed thereon and thence through the crankpin to the crankpin bearing for lubrication thereof.

3. In an engine crankshaft having a hollow crankpin, means borne thereon tending to load the pin predominantly and continuously in one sector thereof, cooling fins within said hollow on that part of the pin closest to said loaded sector, and means for directing cooling lubricant first over and upon said fins and thence to the crankpin journal for lubrication thereof.

4. In an engine crankshaft having a hollow crankpin, means borne thereon tending to load the pin predominantly and continuously in one sector thereof, cooling fins within said hollow on that part of the pin closest to said loaded sector, and means for directing cooling lubricant first over and upon said fins, said means comprising a lubricant conduit within said hollow having lubricant outlet openings directing lubricant toward said fins and said crankpin having a through opening for lubricant passage from the hollow to the crankpin bearing.

5. In an engine crankshaft having a hollow crankpin, means thereon tending to load the pin predominantly and continuously in one sector thereof, and means for directing cooling lubricant first upon the interior wall of the pin closest to said loaded sector and thence to the crankpin bearing.

6. In an engine crankshaft having a hollow crankpin, means thereon tending to load the pin predominantly and continuously in one sector thereof, and means for directing cooling lubricant first upon the interior wall of the pin closest to said loaded sector, said means comprising a lubricant conduit within said hollow having lubricant openings directed toward said interior wall, and means to conduct lubricant from the hollow to the crankpin bearing.

7. In a hollow journal and bearing assembly wherein the load therebetween predominates on a certain sector of the journal thereby causing a temperature rise thereat disproportionate to the temperature rise at other parts of the journal, means directing cooling lubricant predominantly toward the part of the interior journal wall closest to said predominantly loaded sector, and means conducting lubricant from the journal hollow to the journal bearing.

8. In a hollow journal and bearing assembly wherein the load therebetween predominates on a certain sector of the journal, thereby causing a temperature rise thereat disproportionate to the temperature rise at other parts of the journal, means directing cooling lubricant predominantly toward the part of the interior journal wall closest to said predominantly loaded sector, said means including a cooling lubricant conduit within the journal having nozzles for lubricant outlet facing toward said interior journal wall part, and means conducting lubricant from the journal hollow to the journal bearing.

9. In a hollow journal and bearing assembly wherein the load therebetween predominates on a certain sector of the journal, thereby causing a temperature rise thereat disproportionate to the temperature rise at other parts of the journal, means directing cooling lubricant predominantly toward the part of the interior journal wall closest to said predominantly loaded sector, cooling fins formed upon said interior journal wall part, and means conducting lubricant from the journal hollow to the journal bearing.

10. In an engine crankshaft comprising a hollow crankpin embraced by a bearing and a main hollow journal joined to the crankpin by a cheek, means to feed oil to said hollow journal, said cheek having an oil conducting drilling connecting with the journal hollow, a tube fitted within the crankpin in clearance relation with the interior wall thereof, means to lead oil from the cheek drilling to the interior of the tube, said tube having a series of holes facing those parts of the crankpin which tend to run hottest whereby oil within the tube is directed through said holes against the hottest crankpin portions, and duct means through the crankpin conducting oil from the hollow thereof to the crankpin bearing.

11. In an engine crankshaft comprising a hollow crankpin embraced by a bearing and a main hollow journal joined to the crankpin by a cheek, means to feed oil to said hollow journal, said cheek having an oil conducting drilling connecting with the journal hollow, a tube fitted within the crankpin in clearance relation with the interior wall thereof, means to lead oil from the cheek drilling to the interior of the tube, said tube having a series of holes facing those parts of the crankpin which tend to run hottest whereby oil within the tube is directed through said holes against the hottest crankpin portions, and duct means through the crankpin conducting oil from the hollow thereof to the crankpin bearing, said duct means being on the outer part of the crankpin and the tube holes opening toward the inner part of the crankpin.

12. In a hollow shaft rotatable in a bearing the shaft being loaded continuously through only one sector thereof whereby the shaft tends to become heated at the loaded sector to a greater extent than at the balance of the shaft, means to feed lubricant to the shaft hollow, means carried by the shaft and lying within the shaft hollow for directing entering oil to the wall adjacent the loaded sector of the shaft for cooling same, before said oil passes to other parts of the shaft hollow, and a duct through the shaft wall for conducting lubricant from the shaft hollow to the bearing.

13. In an engine crankshaft having a hollow crankpin fed with cooling lubricant, means loading the pin predominantly and continuously in one sector thereof, means for conducting lubricant from the pin hollow to the journal bearing at the unloaded side thereof, and means to guide the entering lubricant in its flow to said conducting means against and along that part of the interior wall of the crankpin closest to said loaded sector.

14. In a hollow journal and bearing assembly wherein the load therebetween predominates on a certain sector of the journal, means to conduct lubricant into the journal hollow, means comprising a conduit through the journal wall to conduct said lubricant to the unloaded side of the journal bearing, and means to guide the cool entering lubricant, in its passage from said conducting means to said conduit, against and along that part of the interior journal wall closest to said predominantly loaded sector.

PHILIP B. TAYLOR.
WILTON G. LUNDQUIST.